(12) United States Patent
Zheng et al.

(10) Patent No.: US 8,712,773 B2
(45) Date of Patent: Apr. 29, 2014

(54) METHOD AND SYSTEM FOR MODELING A COMMON-LANGUAGE SPEECH RECOGNITION, BY A COMPUTER, UNDER THE INFLUENCE OF A PLURALITY OF DIALECTS

(75) Inventors: Fang Zheng, Beijing (CN); Xi Xiao, Beijing (CN); Linquan Liu, Beijing (CN); Zhan You, Beijing (CM); Wenxiao Cao, Beijing (CN); Makoto Akabane, Tokyo (JP); Ruxin Chen, Redwood City, CA (US); Yoshikazu Takahashi, Saitama (JP)

(73) Assignees: Sony Computer Entertainment Inc., Tokyo (JP); Tsinghua University, Beijing (CN)

( * ) Notice: Subject to any disclaimer, the term of this patent is extended or adjusted under 35 U.S.C. 154(b) by 1217 days.

(21) Appl. No.: 12/608,191

(22) Filed: Oct. 29, 2009

(65) Prior Publication Data
US 2010/0121640 A1    May 13, 2010

(30) Foreign Application Priority Data
Oct. 31, 2008   (CN) .......................... 2008 1 0225354

(51) Int. Cl.
*G10L 15/00*    (2013.01)
(52) U.S. Cl.
USPC .............. 704/240; 704/9; 704/254; 704/256; 704/257; 434/185
(58) Field of Classification Search
USPC .............. 704/240, 254, 256, 257, 9; 455/414; 434/185
See application file for complete search history.

(56) References Cited

U.S. PATENT DOCUMENTS 5,865,626 A * 2/1999 Beattie et al. ................. 434/185
6,963,837 B1 * 11/2005 Finke et al. .................... 704/256

(Continued)

OTHER PUBLICATIONS

Liu, Linquan, Thomas Zheng, and Wenhu Wu. "State-dependent phoneme-based model merging for dialectal chinese speech recognition." Chinese Spoken Language Processing (2006): 282-293.*

(Continued)

*Primary Examiner* — Richemond Dorvil
*Assistant Examiner* — Mark Villena
(74) *Attorney, Agent, or Firm* — Katten Muchin Rosenman LLP

(57) ABSTRACT

The present invention relates to a method for modeling a common-language speech recognition, by a computer, under the influence of multiple dialects and concerns a technical field of speech recognition by a computer. In this method, a triphone standard common-language model is first generated based on training data of standard common language, and first and second monophone dialectal-accented common-language models are based on development data of dialectal-accented common languages of first kind and second kind, respectively. Then a temporary merged model is obtained in a manner that the first dialectal-accented common-language model is merged into the standard common-language model according to a first confusion matrix obtained by recognizing the development data of first dialectal-accented common language using the standard common-language model. Finally, a recognition model is obtained in a manner that the second dialectal-accented common-language model is merged into the temporary merged model according to a second confusion matrix generated by recognizing the development data of second dialectal-accented common language by the temporary merged model. This method effectively enhances the operating efficiency and admittedly raises the recognition rate for the dialectal-accented common language. The recognition rate for the standard common language is also raised.

8 Claims, 2 Drawing Sheets

(56) References Cited

U.S. PATENT DOCUMENTS

| | | |
|---|---|---|
| 7,315,811 B2* | 1/2008 | Cote et al. .......................... 704/9 |
| 7,319,958 B2* | 1/2008 | Melnar et al. ................. 704/254 |
| 2004/0176078 A1* | 9/2004 | Melnar et al. .............. 455/414.1 |
| 2005/0165602 A1* | 7/2005 | Cote et al. .......................... 704/9 |
| 2006/0085186 A1* | 4/2006 | Ma et al. ....................... 704/240 |
| 2008/0059188 A1* | 3/2008 | Konopka et al. ............. 704/257 |
| 2008/0147404 A1* | 6/2008 | Liu et al. .................... 704/256.2 |

OTHER PUBLICATIONS

Zheng, Fang, et al. "Mandarin pronunciation modeling based on CASS corpus." Journal of Computer Science and Technology 17.3 (2002): 249-263.*

* cited by examiner

METHOD AND SYSTEM FOR MODELING A COMMON-LANGUAGE SPEECH RECOGNITION, BY A COMPUTER, UNDER THE INFLUENCE OF A PLURALITY OF DIALECTS

BACKGROUND OF THE INVENTION

1. Field of the Invention

The present invention relates to a method, a system and a program for modeling a common-language speech recognition, by a computer, under the influence of multiple dialects, and also relates to a recording medium that stores the program. The present invention particularly relates to a field of speech recognition by a computer.

2. Description of the Related Art

Enhancing robustness has been an important issue and a difficult point to achieve in the field of speech recognition. A major factor of deterioration in robustness of speech recognition lies in a problem involving linguistic accents. For example, the Chinese language has many dialects, which leads to a significant problem of accents. The problem gives incentives for ongoing research activities. In the conventional speech recognition system, the recognition rate for a standard common language is high but the recognition rate for an accented common language influenced by dialects (hereinafter referred to as "dialectal-accented common language" or simply as "dialectal common language" also) is low. To address this problem, a method such as "adaptation" may be used as a countermeasure in general. However, a precondition in this case is that a sufficient amount of data for the dialectal-accented common language must be provided. With this method, there are cases where the recognition rate for the standard common language drops markedly. Since there are many kinds of dialects, the work efficiency is degraded if an acoustic model is trained repeatedly for the respective kinds of dialects.

SUMMARY OF THE INVENTION

The present invention has been made in view of the foregoing problems, and one of purposes is to provide a method for modeling a common language speech recognition, by a computer, under the influence of a plurality of dialects, the method being capable of raising the recognition rate for dialectal-accented common languages with a small amount of data and guaranteeing to sustain the recognition rate for the standard common language, and to provide a system therefor.

A method, for modeling a common-language speech recognition by a computer under the influence of a plurality of dialects, includes the following steps of:

(1) generating a triphone standard common-language model based on training data of standard common language, generating a first monophone dialectal-accented common-language model based on development data of dialectal-accented common language of first kind, and generating a second monophone dialectal-accented common-language model based on development data of dialectal-accented common language of second kind;

(2) generating a first confusion matrix by recognizing the development data of the dialectal-accented common language of first kind using the standard common-language model, and obtaining a temporary merged model in a manner that the first dialectal-accented common-language model is merged into the standard common-language model according to the first confusion matrix; and (3) generating a second confusion matrix by recognizing the development data of the dialectal-accented common language of second kind using the temporary merged model, and obtaining a recognition model in a manner that the second dialectal-accented common-language model is merged into the temporary merged model according to the second confusion matrix.

The merging method as described in the above steps (2) and (3) is such that:

a probability density function of the temporary merged model is expressed by $$p'(x|s) = \lambda_1 p(x|s) + (1-\lambda_1) p(x|d_1) p(d_1|s)$$

where x is an observation feature vector of speech to be recognized, s is a hidden Markov state in the standard common-language model, $d_1$ is a hidden Markov state in the first dialectal-accented common-language model, and $\lambda_1$ is a linear interpolating coefficient such that $0<\lambda_1<1$, and wherein a probability density function of the merged recognition model is expressed by $$p''(x|s) = \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \sum_{p=1}^{P}\sum_{q=1}^{Q} w_{pq}^{(dc2)'} N_{pq}^{(dc2)}(\cdot)$$

where $w_k^{(sc)'}$ is a mixture weight for the hidden Markov state of the standard common-language model, $w_{mn}^{(dc1)'}$ is a mixture weight for the hidden Markov state of the first dialectal-accented common-language model, $w_{pq}^{(dc2)'}$ is a mixture weight for the hidden Markov state of the second dialectal-accented common-language model, K is the number of Gaussian mixtures for Hidden Markov Model state s in the standard common-language model, $N_k^{(sc)}(\bullet)$ is an element of Gaussian mixture for Hidden Markov Model state s, M is the number of $d_1$ that is considered as the pronunciation variants occurring between the first dialectal-accented common-language model for $d_1$ and the standard common-language-model, N is the number of Gaussian mixtures for Hidden Markov Model state $d_1$ in the first dialectal-accented common-language model, $N_{mn}^{(dc1)}(\bullet)$ is an element of Gaussian mixture for Hidden Markov Model state $d_1$, P is the number of $d_2$ that is considered as the pronunciation variants occurring between the second dialectal-accented model for $d_2$ and the standard common-language model, Q is the number of Gaussian mixtures for Hidden Markov Model state $d_2$ in the second dialectal-accented model, $N_{pq}^{(dc2)}(\bullet)$ is an element of Gaussian mixture for Hidden Markov Model state $d_2$.

The method, for modeling a common-language speech recognition by a computer under the influence of a plurality of dialects, according to the above embodiment achieves the following advantageous effects.

Each of a plurality of dialectal-accented common models is merged into a standard common-language model using an iterative method, so that the redundant operation of training an acoustic model for each of dialects can be avoided and therefore the work efficiency can be enhanced. Also, according to this method, the recognition rate for dialectal-accented common languages can be admittedly raised. At the same time, the recognition rate for the standard common language never deteriorates and sometimes increases. Thus, this method resolves a problem, as in other conventional methods, where the recognition rate for the standard common language markedly deteriorates while a dialectal-accented common language is properly treated.

Optional combinations of the aforementioned processes, and implementations of the invention in the form of apparatuses, systems, recoding media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

A description is now given of preferred embodiments of the present invention with reference to drawings.

Figure 1:
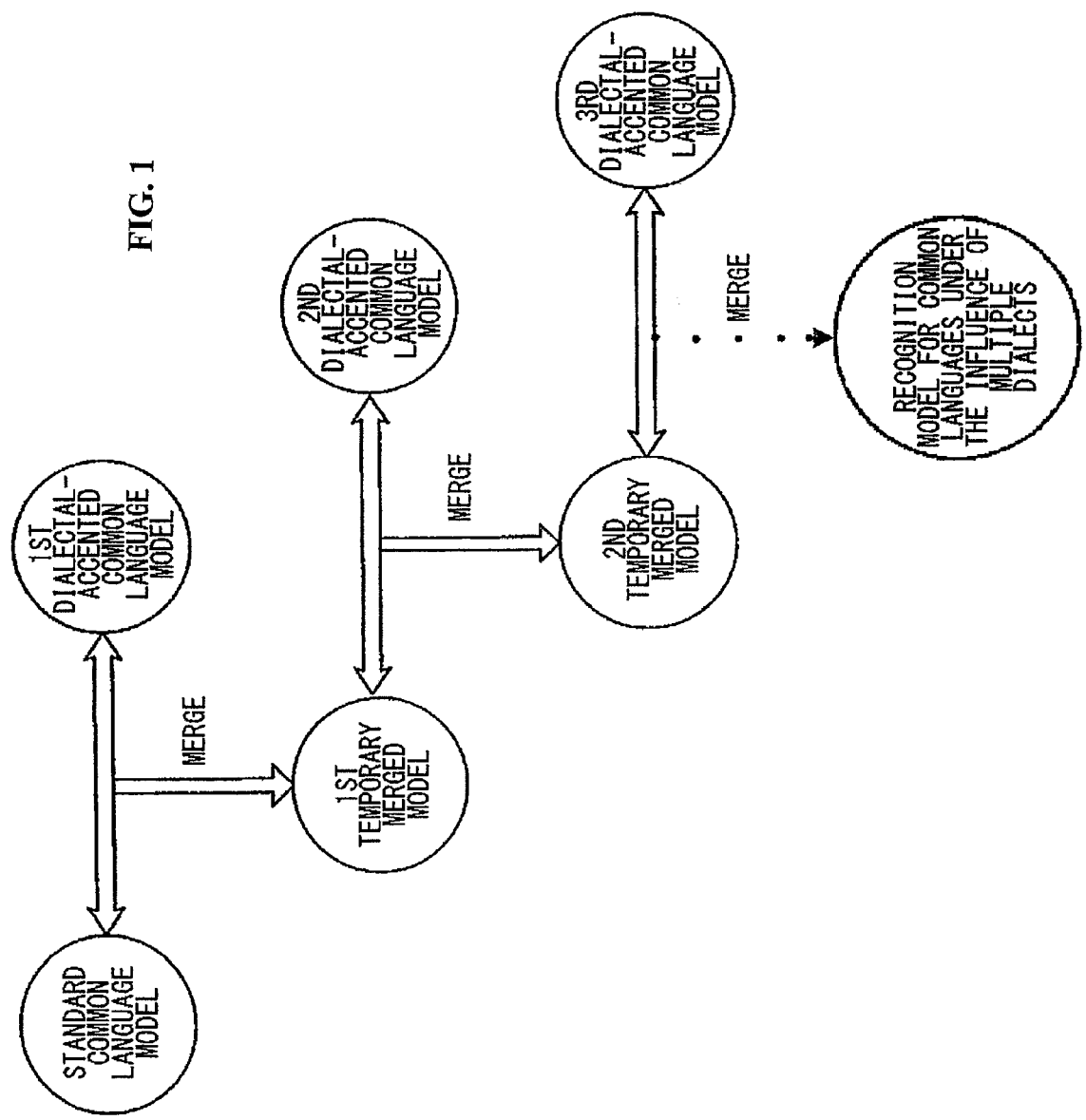
FIG. 1 conceptually shows a principle of a modeling method according to an embodiment.

FIG. 1 conceptually shows the principle of a method for modeling a speech recognition of common language under the influence of an n kinds of dialects (n being an integer greater than or equal to 2) according to an embodiment of the present invention. This modeling method includes the following three steps of:

(1) generating a triphone standard common-language model based on training data of standard common language, and generating first to nth monophone dialectal-accented common-language models for respective corresponding dialectal-accented common languages of first to nth kinds, based on the development data thereof;

(2) generating a first confusion matrix by recognizing the development data of the dialectal-accented common language of first kind using the standard common-language model, and obtaining a first temporary merged model in a manner that the first dialectal-accented common-language model is merged into the standard common-language model according to the first confusion matrix; and (3) generating an ith confusion matrix by recognizing the development data of dialectal-accented common language of ith kind using an (i−1)th temporary merged model (i being an integer such that 2≤i≤n), and obtaining a final recognition model by repeating, from i=2 to i=n, an operation of merging the ith dialectal-accented common-language model into the (i−1)th temporary merged model according to the ith confusion matrix.

Figure 2:
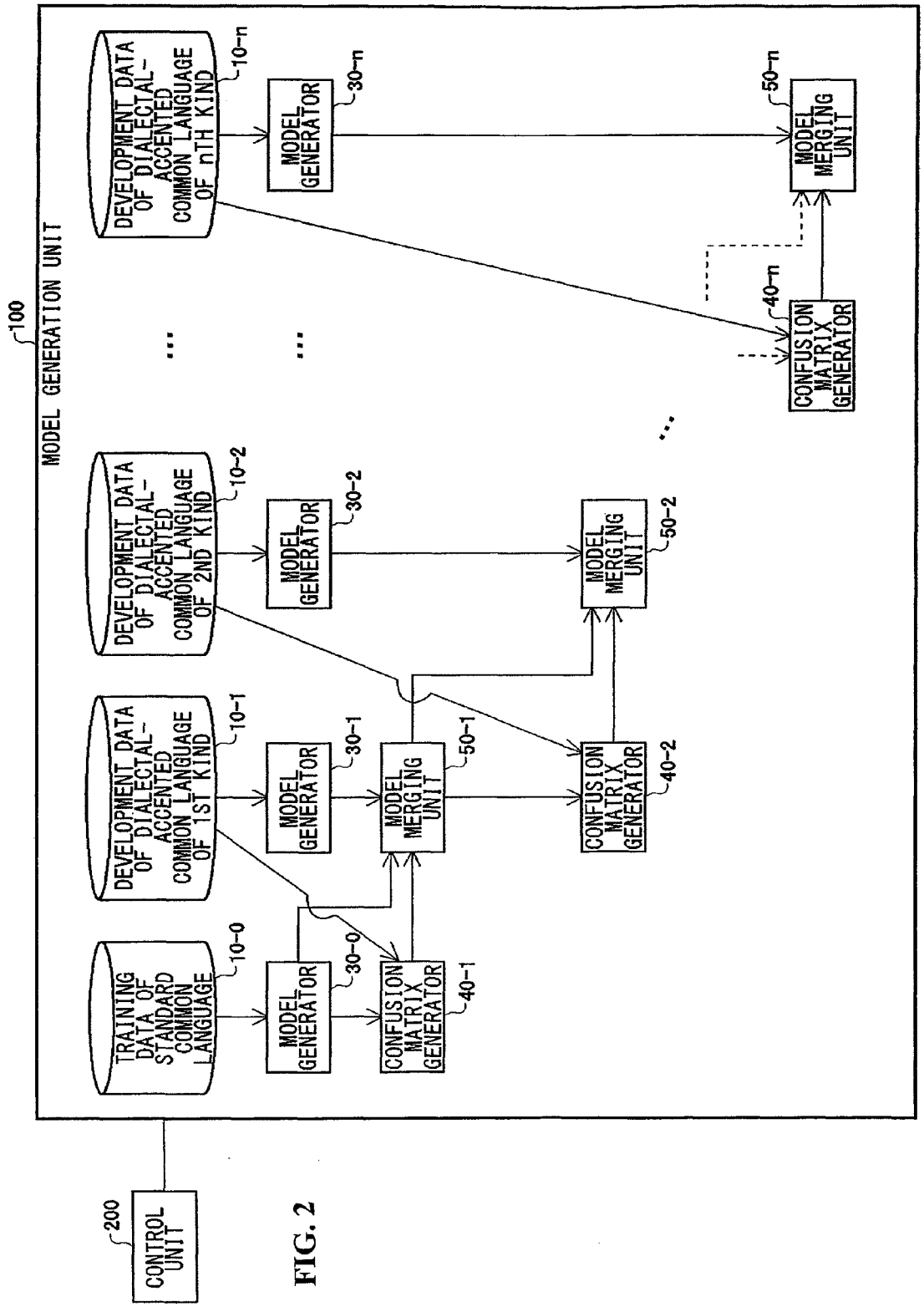
FIG. 2 is a block diagram showing an example of a modeling system that realizes a modeling method as shown in FIG. 1.

FIG. 2 is a block diagram showing a system for modeling the aforementioned speech recognition of a common language under the influence of a plurality of dialects. A modeling system according to the present embodiment comprises a model generation unit 100 and a control unit 200. Referring to FIG. 2, the model generation unit 100 includes training database (hereinafter abbreviated as "training DB" also) 10-0, development databases (hereinafter abbreviated as "development DB" also) 10-1 to 10-$n$, model generators 30-0 to 30-$n$, confusion matrix generators 40-1 to 40-$n$, and model merging units 50-1 to 50-$n$.

The training DB 10-0 is a database that stores the training data of a standard common language.

The development DB 10-1 to 10-$n$ are databases that store the development data of dialectal-accented common languages of first to nth kinds, respectively.

The model generator 30-0 is used to generate a triphone standard common-language model based on the training data of the standard common language stored in the training DB 10-0.

The model generators 30-1 to 30-$n$ are a sequence of blocks that generate first to nth monophone dialectal-accented common-language models based on the training data of dialectal-accented standard common languages of first to nth kinds stored in the development databases 10-1 to 10-$n$, respectively.

The confusion matrix generators 40-1 to 40-$n$ are a sequence of blocks that generate first to nth confusion matrices by recognizing the development data of the first to nth dialectal-accented common languages of first to nth kinds stored in the first to nth development databases 10-1 to 10-$n$ using the models generated by the corresponding model generators 30-0 to 30-($n$-1).

The model merging unit 50-1 generates a first temporary merged model in a manner that the first dialectal-accented common-language model generated by the model generator 30-1 is merged into a standard common-language model generated by the model generator 30-0 according to the first confusion matrix generated by the confusion matrix generator 40-1.

The model merging units 50-2 to 50-($n$-1) generate second to (n−1)th temporary merged models in a manner that the second to (n−1)th dialectal-accented common-language models generated by the model generators 30-2 to 30-($n$-1) are each merged into a temporary merged model generated by a model merging unit placed immediately prior thereto according to the second to (n−1)th confusion matrices generated by the corresponding confusion matrix generators 40-2 to 40-($n$-1).

The model merging unit 50-$n$ finally generates a recognition model in a manner that the nth dialectal-accented common-language model generated by the model generator 30-$n$ is merged into the (n−1)th temporary merged model generated by the model merging unit 50-($n$-1) placed immediately prior thereto according to the nth confusion matrix generated by the confusion matrix generator 40-$n$.

The control unit 200 controls the model generation unit 100 in such a manner as to operate according to the aforementioned modeling method.

In FIG. 2, the training DB 10-0 and the development DBs 10-1 to 10-$n$ are depicted as separate blocks. However, they may be configured as a single database or a plurality of databases that store training data of a standard common language, development data of dialectal-accented common languages of first to nth kinds. Also, the model generators 30-0 to 30-$n$ are depicted as separate blocks in FIG. 2 but they may be configured as a single entity or a plurality of model generators and the single or plurality of model generators may be used in a time sharing manner, based on a control performed by the control unit 200. Although the confusion matrix generators 40-1 to 40-$n$ are depicted as separate blocks in FIG. 2, they may be configured as a single entity or a plurality of confusion matrix generators and the single or plurality of confusion matrix generators may be used in a time sharing manner, based on a control performed by the control unit 200. Although the model merging units 50-1 to 50-$n$ are depicted as separate blocks in FIG. 2, they may be configured as a single entity or a plurality of model merging units and the single or plurality of model merging units may be used in a time sharing manner, based on a control performed by the control unit 200.

A concrete description is hereinbelow given of a method for modeling a recognition model capable of being compatible with two different kinds of dialectal-accented common languages (n=2).

This modeling method includes the following steps of:

(1) generating a triphone standard common-language model based on training data of standard common language, generating a first monophone dialectal-accented common-language model based on development data of dialectal-accented common language of first kind, and generating a second monophone dialectal-accented common-language model based on development data of dialectal-accented common language of second kind;

(2) acquiring a first confusion matrix by recognizing the development data of the dialectal-accented common language of first kind using the standard common-language model, and obtaining a temporary merged model in a manner that the first dialectal-accented common-language model is merged into the standard common-language model according to the first confusion matrix; and (3) acquiring a second confusion matrix by recognizing the development data of the dialectal-accented common language of second kind using the temporary merged model, and obtaining a recognition model in a manner that the second dialectal-accented common-language model is merged into the temporary merged model according to the second confusion matrix.

The merging method as described in the above steps (2) and (3) is such that:

the probability density function of the temporary merged model is expressed by $$p'(x|s) = \lambda_1 p(x|s) + (1-\lambda_1) p(x|d_1) p(d_1|s)$$

where x is an observation feature vector of speech to be recognized, s is a hidden Markov state in the standard common-language model, $d_1$ is a hidden Markov state in the first dialectal-accented common-language model, and $\lambda_1$ is a linear interpolating coefficient such that $0 < \lambda_1 < 1$.

Also, the probability density function of the recognition model is expressed by $$p''(x|s) = \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \sum_{p=1}^{P}\sum_{q=1}^{Q} w_{pq}^{(dc2)'} N_{pq}^{(dc2)}(\cdot)$$

where $w_k^{(sc)'}$ is a mixture weight for the hidden Markov state of the standard common-language model, $w_{mn}^{(dc1)'}$ is a mixture weight for the hidden Markov state of the first dialectal-accented common-language model, $w_{pq}^{(dc2)'}$ is a mixture weight for the hidden Markov state of the second dialectal-accented common-language model, K is the number of Gaussian mixtures for Hidden Markov Model state s in the standard common-language model, $N_k^{(sc)}(\cdot)$ is an element of Gaussian mixture for Hidden Markov Model state s, M is the number of $d_1$ that is considered as the pronunciation variants occurring between the first dialectal-accented common-language model for $d_1$ and the standard common-language-model, N is the number of Gaussian mixtures for Hidden Markov Model state $d_1$ in the first dialectal-accented common-language model, $N_{mn}^{(dc1)}(\cdot)$ is an element of Gaussian mixture for Hidden Markov Model state $d_1$, P is the number of $d_2$ that is considered as the pronunciation variants occurring between the second dialectal-accented model for $d_2$ and the standard common-language model, Q is the number of Gaussian mixtures for Hidden Markov Model state $d_2$ in the second dialectal-accented model, $N_{pq}^{(dc2)}(\cdot)$ is an element of Gaussian mixture for Hidden Markov Model state $d_2$.

The method according to the present embodiment is characterized by the features that models created based on various kinds of dialectal-accented data are merged into the standard common-language model in an iterative manner. The fundamental flow of this method is illustrated in FIG. 1. In the case of merging two different dialectal-accented common models and standard common-language model using the flow in FIG. 1, the probability density function of a temporary merged model can be expressed by $$p'(x|s) = \lambda_1 p(x|s) + (1-\lambda_1) p(x|d_1) p(d_1|s).$$

In the above equation, X is an observation feature vector of speech to be recognized, s is a hidden Markov state in the standard common-language model, $d_1$ is a hidden Markov state in the first dialectal-accented common-language model. $\lambda_1$ is a linear interpolating coefficient such that $0 < \lambda_1 < 1$, and indicates a mixture weight in the temporary merged model. In the actual setting, the optimum $\lambda_1$ is determined through experiments. $p(d_1|s)$ is the output probability of the hidden Markov state in the first dialectal-accented common-language model given the corresponding hidden Markov state in the standard common-language model and indicates a variation of pronunciations in the dialect of first kind relative to the standard common language. For the same reasoning, the probability density function of the final merged model may be expressed by $$\begin{aligned}
p''(x|s) &= \lambda_2 p'(x|s) + (1-\lambda_2) p(x|d_2) p'(d_2|s) \\
&= \lambda_2 \lambda_1 p(x|s) + \lambda_2(1-\lambda_1) p(x|d_1) p(d_1|s) + \\
&\quad (1-\lambda_2) p(x|d_2) p'(d_2|s) \\
&= \lambda_2 \lambda_1 \sum_{k=1}^{K} w_k^{(sc)} N_k^{(sc)}(\cdot) + \lambda_2(1-\lambda_1) \sum_{m=1}^{M} P(d_{1m}|s) \cdot \\
&\quad \sum_{n=1}^{N} w_{mn}^{(dc1)} N_{mn}^{(dc1)}(\cdot) + (1-\lambda_2) \sum_{p=1}^{P} P(d_{2p}|s) \cdot \\
&\quad \sum_{q=1}^{Q} w_{pq}^{(dc2)} N_{pq}^{(dc2)}(\cdot) \\
&= \sum_{k=1}^{K} \lambda_2 \lambda_1 w_k^{(sc)} N_k^{(sc)}(\cdot) + \sum_{m=1}^{M}\sum_{n=1}^{N} \lambda_2(1-\lambda_1) \cdot \\
&\quad P(d_{1m}|s) \cdot w_{mn}^{(dc1)} N_{mn}^{(dc1)}(\cdot) + \sum_{p=1}^{P}\sum_{q=1}^{Q} (1-\lambda_2) \cdot \\
&\quad P(d_{2p}|s) \cdot w_{pq}^{(dc2)} N_{pq}^{(dc2)}(\cdot) \\
&= \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \\
&\quad \sum_{p=1}^{P}\sum_{q=1}^{Q} w_{pq}^{(dc2)'} N_{pq}^{(dc2)}(\cdot)
\end{aligned}$$

where $d_2$ is a hidden Markov state in the second dialectal-accented common-language model, $\lambda_2$ is a linear interpolating coefficient such that $0 < \lambda_2 < 1$, and indicates a mixture weight in the final merged model. In the actual setting, the optimum $\lambda_2$ is determined through experiments. K is the number of Gaussian mixtures for Hidden Markov Model state s in the standard common-language model. $N_k^{(sc)}(\cdot)$ is an element of Gaussian mixture for Hidden Markov Model state s. M is the number of $d_1$ that is considered as the pronunciation variants occurring between the first dialectal-accented common-language model for $d_1$ and the standard common-language-model; N is the number of Gaussian mixtures for Hidden Markov Model state $d_1$ in the first dialectal-accented common-language model. $N_{mn}^{(dc1)}(\bullet)$ is an element of Gaussian mixture for Hidden Markov Model state $d_1$. $P(d_{1m}|s)$ is the corresponding probability of pronunciation modeling. P is the number of $d_2$ that is considered as the pronunciation variants occurring between the second dialectal-accented model for $d_2$ and the standard common-language model; Q is the number of Gaussian mixtures for Hidden Markov Model state $d_2$ in the second dialectal-accented model. $N_{pq}^{(dc2)}(\bullet)$ is an element of Gaussian mixture for Hidden Markov Model state $d_2$. $P(d_{2p}|s)$ is the corresponding probability of pronunciation model.

It is easy to see from the last line of the above equation that the final merged model is actually constructed by taking the weighted sum of the standard common model, the first dialectal-accented model and the second dialectal-accented model. $w_k^{(sc)'}$, $w_{mn}^{(dc1)'}$ and $w_{pq}^{(dc2)'}$ indicate the mixture weights of three models represented by the above equation. Since the confusion matrices $P(d_{1m}|s)$ and $P(d_{2p}|s)$ and the interpolating coefficients $\lambda_1$ and $\lambda_2$ are already known, the weights for the mixture of normal distributions of three models can be easily determined.

A description is now given of exemplary embodiments:

TABLE 1

(Description of experimental data)

| Data set | Database | Details |
| --- | --- | --- |
| Training set of standard common language | Training data of standard common language | 120 speakers, 200 long sentences per speaker |
| Test set of standard common language | Test data of standard common language | 12 speakers, 100 commands per speaker |
| Development set of Chuan common language | Development data of Chuan dialectal common language | 20 speakers, 50 long sentences per speaker |
| Test set of Chuan common language | Test data of Chuan dialectal common language | 15 speakers, 75 commands per speaker |
| Development set of Minnan common language | Development data of Minnan dialectal common language | 20 speakers, 50 long sentences per speaker |
| Test set of Minnan common language | Test data of Minnan dialectal common language | 15 speakers, 75 commands per speaker |

As evident from Table 1, data are divided into the standard common language, the Chuan (an abbreviation of Sichuan Dialect) dialectal common language, and the Minnan dialectal common language, and the data are also divided into two parts, namely data for training/development and data for testing.

Baseline:

TABLE 2

(Description of a test baseline system)

| | Word Error Rate (WER) Test set | | |
| --- | --- | --- | --- |
| Recognition model | Test set of standard common language | Test set of Minnan dialectal language | Test set of Chuan dialectal common language |
| Mixed training recognition model | 8.5% | 21.7% | 21.1% |

A mixed training recognition model is used in the baseline. This mixed training recognition model is trained based on the total of three kinds of data (standard and 2 dialectal).

Results of experiments:

TABLE 3

Results of experiments

| | Word Error Rate (WER) Test set | | |
| --- | --- | --- | --- |
| Recognition model | Test set of standard common language | Test set of Minnan dialectal common language | Test set of Chuan dialectal common language |
| Recognition model according to the present embodiment | 6.3% | 11.2% | 15.0% |

As evident from Table 3, the use of a model trained by employing the method of calculation according to the present embodiment obviously improves the recognition rate for two dialects as well. At the same time, the recognition rate for the standard common language is significantly improved. Thus the methods according to the above-described embodiment prove viable and effective.

Further, according to the above-described methods, the final recognition model can be obtained by iteratively merging each dialectal-accented common-language model into the standard common-language model.

What is claimed is:

1. A computer-implemented method for creating a speech recognition model, the method performed by a processor and comprising the steps of:
generating, by the processor, a standard model of a triphone standard common language based on training data of the standard common language;
generating a first model of a monophone dialectal-accented common language based on development data of a first accent of the standard common language;
creating a temporary language model by merging, through an iterative process, the standard model and the first model with reference to a first confusion matrix formed between the standard model and the development data of the first accent;
generating a second model of a monophone dialectal-accented common language based on development data of a second accent of the standard common language that is different from the first accent; and creating the speech recognition model by merging, through an iterative process, the second model and the temporary language model with reference to a second confusion matrix formed between the temporary model and the development data of the second accent.

2. A modeling method according to claim 1, wherein a probability density function used in the merging of the temporary language model is expressed by $$p'(x|s)=\lambda_1 p(x|s)+(1-\lambda_1)p(x|d_1)p(d_1|s)$$

where x is an observation feature vector of voice to be recognized, s is a hidden Markov state in the standard model, $d_1$ is a hidden Markov state in the first model, and $\lambda_1$ is a linear interpolating coefficient such that $0<\lambda_1<1$, and wherein a probability density function used in the merging of the speech recognition model is expressed by $$p''(x|s) = \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \sum_{p=1}^{P}\sum_{q=1}^{Q} w_{pq}^{(dc2)'} N_{pq}^{(dc2)}(\cdot)$$

where $w_k^{(sc)'}$ is a mixture weight for the hidden Markov state of the standard model, $w_{mn}^{(dc1)'}$ is mixture weight for the hidden Markov state of the first model, $w_{pq}^{(dc2)'}$ is a mixture weight for the hidden Markov state of the second model, K is the number of Gaussian mixtures for Hidden Markov Model state s in the standard model, $N_k^{(sc)}(\bullet)$ is an element of Gaussian mixture for Hidden Markov Model state s, M is the number of $d_1$ that is considered as the pronunciation variants occurring between the first model for $d_1$ and the standard model, N is the number of Gaussian mixtures for Hidden Markov Model state $d_1$ in the first model, $N_{mn}^{(dc1)}(\bullet)$ is an element of Gaussian mixture for Hidden Markov Model state $d_1$, P is the number of $d_2$ that is considered as the pronunciation variants occurring between the second model for $d_2$ and the standard model, Q is the number of Gaussian mixtures for Hidden Markov Model state $d_2$ in the second model, $N_{pq}^{(dc2)}(\bullet)$ is an element of Gaussian mixture for Hidden Markov Model state $d_2$.

3. A non-transitory, computer-readable medium encoded with a program, executable by a computer, for creating a speech recognition model, the program comprising functions executed by a processor of:
generating a standard model of a triphone standard common language based on training data of the standard common language;
generating a first model of a monophone dialectal-accented common language based on development data of a first accent of the standard common language;
creating a temporary language model by merging, through an iterative process, the standard model and the first model with reference to a first confusion matrix formed between the standard model and the development data of the first accent;
generating a second model of a monophone dialectal-accented common language based on development data of a second accent of the standard common language that is different from the first accent; and
creating the speech recognition model by merging, through an iterative process, the second model and the temporary language model with reference to a second confusion matrix formed between the temporary model and the development data of the second accent.

4. A non-transitory, computer-readable medium according to claim 3, wherein a probability density function used in the merging of the temporary language model is expressed by $$p'(x|s)=\lambda_1 p(x|s)+(1-\lambda_1)p(x|d_1)p(d_1|s)$$

where x is an observation feature vector of voice to be recognized, s is a hidden Markov state in the standard model, $d_1$ is a hidden Markov state in the first model, and $\lambda_1$ is a linear interpolating coefficient such that $0<\lambda_1<1$, and wherein a probability density function used in the merging of the speech recognition model is expressed by $$p''(x|s) = \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \sum_{p=1}^{P}\sum_{q=1}^{Q} w_{pq}^{(dc2)'} N_{pq}^{(dc2)}(\cdot)$$

where $w_k^{(sc)'}$ is a mixture weight for the hidden Markov state of the standard model, $w_{mn}^{(dc1)'}$ is mixture weight for the hidden Markov state of the first model, $w_{pq}^{(dc2)'}$ is a mixture weight for the hidden Markov state of the second model, K is the number of Gaussian mixtures for Hidden Markov Model state s in the standard model, $N_k^{(sc)}(\bullet)$ is an element of Gaussian mixture for Hidden Markov Model state s, M is the number of $d_1$ that is considered as the pronunciation variants occurring between the first model for $d_1$ and the standard model, N is the number of Gaussian mixtures for Hidden Markov Model state $d_1$ in the first model, $N_{mn}^{(dc1)}(\bullet)$ is an element of Gaussian mixture for Hidden Markov Model state $d_1$, P is the number of $d_2$ that is considered as the pronunciation variants occurring between the second model for $d_2$ and the standard model, Q is the number of Gaussian mixtures for Hidden Markov Model state $d_2$ in the second model, $N_{pq}^{(dc2)}(\bullet)$ is an element of Gaussian mixture for Hidden Markov Model state $d_2$.

5. A computer-implemented method for creating a speech recognition model, the method performed by a processor and comprising:
generating, by the processor, a standard model of a triphone standard common language based on training data of the standard common language;
generating a first model of a monophone dialectal-accented common language based on development data of a first accent of the standard common language;
creating a temporary language model by merging, through an iterative process, the standard model and the first model with reference to a first confusion matrix formed between the standard model and the development data of the first accent;
generating a second model to nth model, where n is a natural number greater than or equal to 2, of a monophone dialectal-accented common language based on development data of a second accent to nth accent, respectively, of the standard common language that are different from each other; and
creating the speech recognition model by merging, through an iterative process, an ith model, where i is an integer such that $1<i\leq n$, and an (i−1)th temporary language model with reference to an ith confusion matrix formed between the (i−1)th temporary model and the development data of the ith accent.

6. A non-transitory, computer-readable medium encoded with a program, executable by a computer, for creating a speech recognition model, the program comprising functions performed by a processor of:

generating a standard model of a triphone standard common language based on training data of the standard common language;

generating a first model of a monophone dialectal-accented common language based on development data of a first accent of the standard common language;

creating a temporary language model by merging, through an iterative process, the standard model and the first model with reference to a first confusion matrix formed between the standard model and the development data of the first accent;

generating a second model to nth model, where n is a natural number greater than or equal to 2, of a monophone dialectal-accented common language based on development data of a second accent to nth accent, respectively, of the standard common language that are different from each other; and creating the speech recognition model by merging, through an iterative process, an ith model, where i is an integer such that 1<i≤n, and an (i−1)th temporary language model with reference to an ith confusion matrix formed between the (i−1)th temporary model and the development data of the ith accent.

7. A model generating unit, controlled by a control unit, system for creating a speech recognition model, the model generating unit comprising:

a standard common-language training database, which stores training data of a triphone standard common language;

a first development database, which stores first development data of a monophone dialectal-accented common language based on a first accent of the standard common language;

a second development database, which stores second development data of a monophone dialectal-accented common language based on a second accent of the standard common language that is different from the first accent;

a standard model generator, which generates a standard model based on training data stored in the standard common-language training database;

a first model generator, which generates a first model based on development data of a first accent of the standard common language stored in the first development database;

a temporary model merging unit, which creates a temporary language model by merging, through an iterative process, the standard model and the first model with reference to a first confusion matrix formed, by a first confusion matrix generator, between the standard model and the development data of the first accent stored in the first development database;

a second model generator, which generates a second model based on development data of a second accent of the standard common language stored in the second development database; and a speech recognition model merging unit, which creates the speech recognition model by merging, through an iterative process, the second model and the temporary language model with reference to a second confusion matrix formed, by a second confusion matrix generator, between the temporary model and the development data of the second accent stored in the second development database.

8. The modeling generating unit according to claim 7, wherein a probability density function used by the temporary model merging unit for merging of the temporary language model is expressed by $$p'(x|s) = \lambda_1 p(x|s) + (1-\lambda_1) p(x|d_1) p(d_1|s)$$

where x is an observation feature vector of voice to be recognized, s is a hidden Markov state in the standard model, $d_1$ is a hidden Markov state in the first model, and $\lambda_1$ is a linear interpolating coefficient such that $0<\lambda_1<1$, and wherein a probability density function used by the speech recognition model merging unit for merging of the speech recognition model is expressed by $$p''(x|s) = \sum_{k=1}^{K} w_k^{(sc)'} N_k^{(sc)}(\cdot) + \sum_{m=1}^{M}\sum_{n=1}^{N} w_{mn}^{(dc1)'} N_{mn}^{(dc1)}(\cdot) + \sum_{p=1}^{P}\sum_{q=1}^{Q} w_{pq}^{(dc2)'} N_{pq}^{(dc2)}(\cdot)$$

where $w_k^{(sc)'}$ is a mixture weight for the hidden Markov state of the standard model, $w_{mn}^{(dc1)'}$ is mixture weight for the hidden Markov state of the first model, $w_{pq}^{(dc2)'}$ is a mixture weight for the hidden Markov state of the second model, K is the number of Gaussian mixtures for Hidden Markov Model state s in the standard model, $N_k^{(sc)}(\bullet)$ is an element of Gaussian mixture for Hidden Markov Model state s, M is the number of $d_1$ that is considered as the pronunciation variants occurring between the first model for $d_1$ and the standard model, N is the number of Gaussian mixtures for Hidden Markov Model state $d_1$ in the first model, $N_{mn}^{(dc1)}(\bullet)$ is an element of Gaussian mixture for Hidden Markov Model state $d_1$, P is the number of $d_2$ that is considered as the pronunciation variants occurring between the second model for $d_2$ and the standard model, Q is the number of Gaussian mixtures for Hidden Markov Model state $d_2$ in the second model, $N_{pq}^{(dc2)}(\bullet)$ is an element of Gaussian mixture for Hidden Markov Model state $d_2$.

* * * * *